(12) United States Patent
Fulcher et al.

(10) Patent No.: US 8,110,234 B2
(45) Date of Patent: Feb. 7, 2012

(54) MECHANICAL DEBONING OF POULTRY

(75) Inventors: Garland Christopher Fulcher, Oriental, NC (US); Walter Franklin Lubkin, Jr., Beaufort, SC (US)

(73) Assignee: Chic Pic, LLC, Oriental, NC (US)

( * ) Notice: Subject to any disclaimer, the term of this patent is extended or adjusted under 35 U.S.C. 154(b) by 1025 days.

(21) Appl. No.: 11/243,557

(22) Filed: Oct. 5, 2005

(65) Prior Publication Data

US 2009/0075578 A1    Mar. 19, 2009

(51) Int. Cl.
*A23L 1/31* (2006.01)
(52) U.S. Cl. ......... 426/480; 426/437; 426/513; 452/140
(58) Field of Classification Search .................. 426/332, 426/437, 513, 246, 574, 402, 441; 452/140, 452/135
See application file for complete search history.

(56) References Cited

U.S. PATENT DOCUMENTS

| | | | |
|---|---|---|---|
| 4,575,087 A * | 3/1986 | Sinclair | 273/153 R |
| 5,928,072 A * | 7/1999 | Fulcher et al. | 452/1 |
| 6,036,590 A * | 3/2000 | Kessel | 452/138 |
| 6,132,304 A | 10/2000 | Aarts | |
| 6,383,067 B1 | 5/2002 | Kessel | |
| 6,622,950 B1 | 9/2003 | Fleming et al. | |
| 6,737,095 B2 | 5/2004 | Crider, III et al. | |

* cited by examiner

*Primary Examiner* — Drew Becker
*Assistant Examiner* — Preston Smith
(74) *Attorney, Agent, or Firm* — John B. Hardaway, III; Sara Centioni Kanos Nexen Pruet, LLC

(57) ABSTRACT

An apparatus and a process for extracting poultry meat from crushed and dismembered poultry pieces is provided. The extracting method is based on mechanical separation utilizing heated water spray within a rotating drum assembly for removal and separation of meat from bone and collagen. The water is collected, pumped into a holding tank, and is flavored with natural poultry extract and antifoam agent for recycle within the process. The apparatus includes a hopper, an inclined rotating drum assembly having perforated walls and an internally located nozzle dispensing a water spray for separating meat from bones, a tank having at least one water jet for separating meat from bone fragments, a vibrating dewatering apparatus for separating meat from the water, and a re-circulation system for collection, reheating, and re-using the solution of water and poultry extract. The apparatus and process provides bone free poultry meat that retains the natural poultry flavor and has a low bacterial count because the process is performed in 170° F. water solution.

3 Claims, 7 Drawing Sheets

MECHANICAL DEBONING OF POULTRY

FIELD OF THE INVENTION

This invention relates generally to the art of removing meat from cooked poultry parts and more particularly to an apparatus and process for cleaning and separating poultry meat from the bone, gristle and cartilage.

BACKGROUND OF THE INVENTION

Conventional extractors and extraction processes exist which provide methods for removal of poultry from poultry parts, with varying success and varying labor requirements.

Mechanical processes for separating poultry meat from bone may use processes that crush and extrude meat from de-feathered and eviscerated fowl. For purposes of texture and fat content, many processes such as that taught in U.S. Pat. No. 6,737,095, maintain a pressurized extrusion process at a temperature of 25-55° F. Other pressurized extruder patents such as U.S. Pat. No. 6,622,950 are silent with regard to the preparation of the feed mixture and the temperature control within the auger-type extruder. The same disinterest in preparation may be found in disclosures of piston-type extruders for separating meat from trimmed bones such as in U.S. Pat. No. 6,132,304.

Whole carcass deboning without initial crushing usually involves novel knife systems such as those disclosed in U.S. Pat. Nos. 6,383,067 and 6,036,590. Cooled freshly slaughtered and eviscerated poultry are the feed to the devices.

Prior art devices are adequate for their intended function, but room exists for other devices which will provide a process for removing and cleaning the poultry while preserving the natural poultry flavor, reducing fat and preventing microbial growth.

SUMMARY OF THE INVENTION

It is an object of the invention to provide an apparatus that efficiently removes poultry from bones, providing bone free poultry.

It is a further object of the invention to provide a process that removes poultry from bones utilizing a heated water spray.

It is a further and more particular object of the invention to provide an apparatus that provides a mechanical separation of poultry from bone particles.

It is yet a further and more particular object of the invention to provide a poultry separation process that retains the poultry flavor.

It is an additional object of this invention to provide a separation process that produces boneless poultry with a low bacterial count.

It is an additional and more particular object of this invention to provide a separation process that utilizes re-circulated, heated water.

It is a further and additional object of this invention to provide a separation process that operates with no significant wastage of water.

It is an additional object to provide a separation process that utilizes a heated water that contains natural poultry flavor extract.

These and other objects of the invention are accomplished with an apparatus for separating poultry from bone comprising a rotating drum, a water spray process, a separator tank, a horizontal sluice, and a dewatering process. The water spray process provides heated, pressurized, poultry flavored water for separating poultry from poultry bones, with recovery and re-circulation of the heated flavored water.

DETAILED DESCRIPTION

In accordance with this invention, it has been found that an improved method of extracting cooked poultry meat is attained by the utilization of heated water spray and mechanical separation methods for producing a bone free cooked poultry. It has been found that separation of poultry meat from bone is accomplished with the poultry retaining its natural poultry flavor while having a low bacterial count. Various other advantages and features of this invention will become apparent from a reading of the following description given with reference to the various figures.

Figure 1:
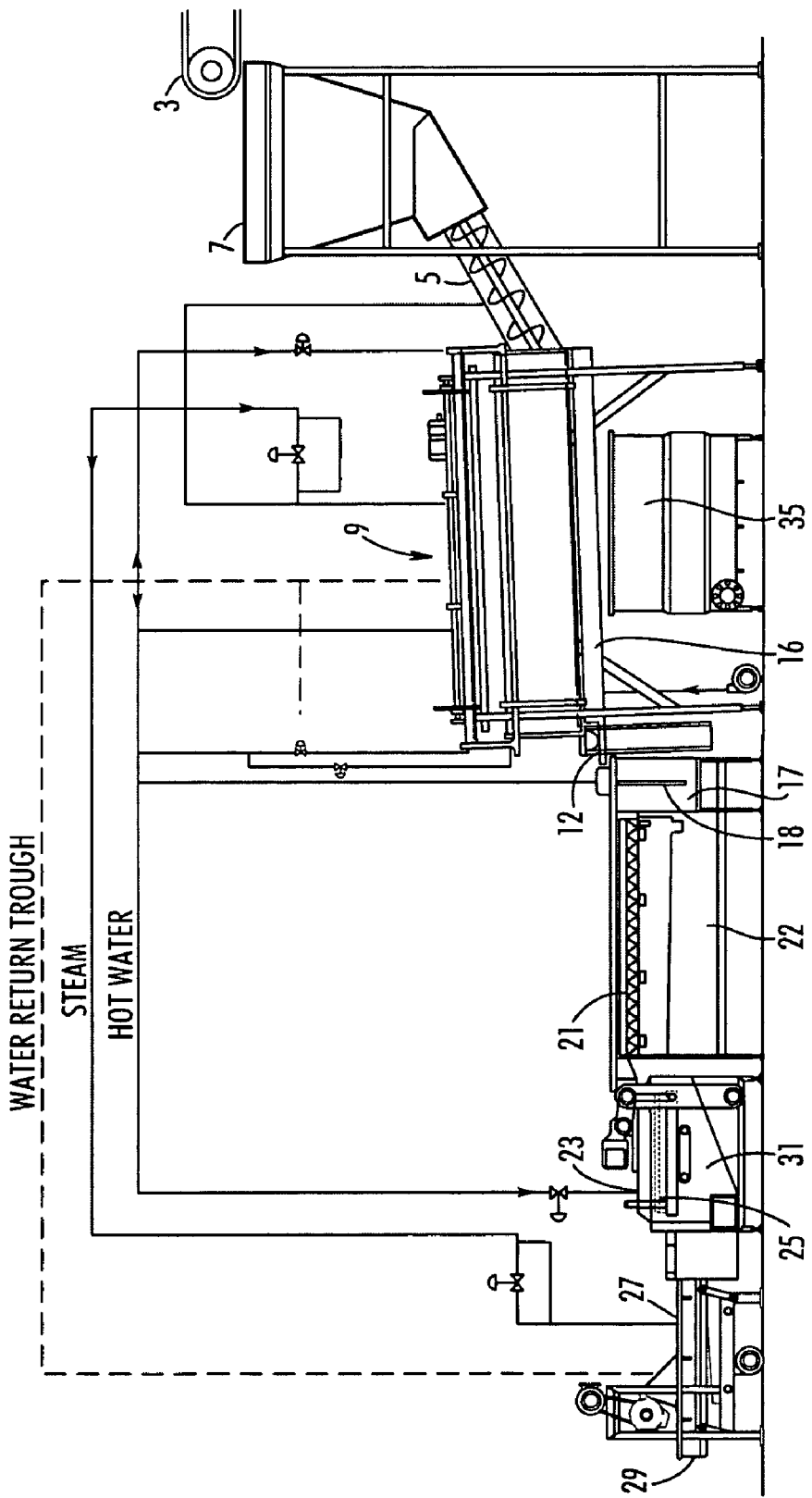
FIG. 1 is a schematic side elevation of the components of this invention operatively.

FIG. 1 is a side elevation schematic of the components of the invention. Cooked, separated poultry parts, which include carcass parts after commercially valuable sections have been excised (the manner of cooking is immaterial) without initial crushing, are conveyed warm or hot via suitable conveying means 3 into hopper 7. At the base of hopper 7 is a means 5 for conveying parts out of hopper 7 into a rotating drum 9.

Figure 2:
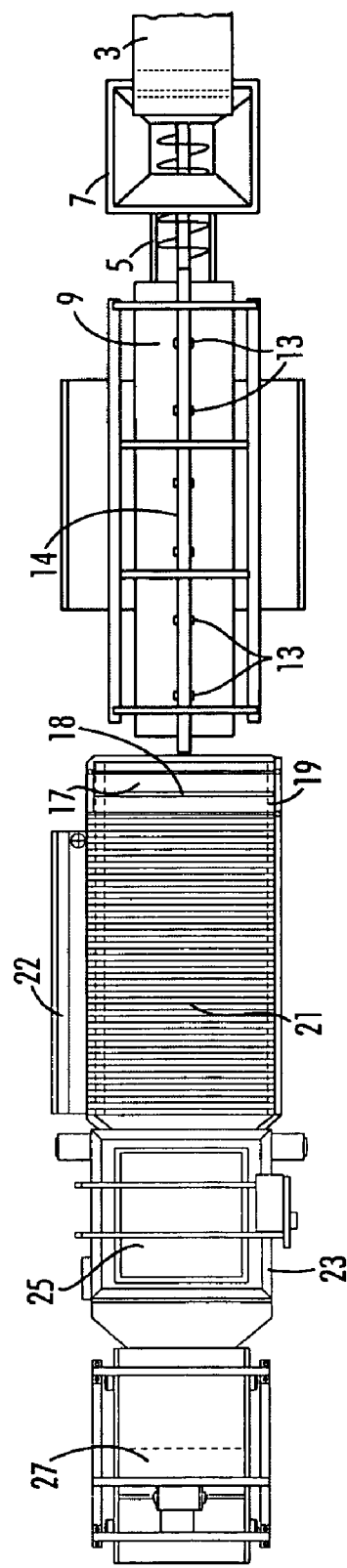
FIG. 2 is a plan view of the components of this invention.
Figure 3:
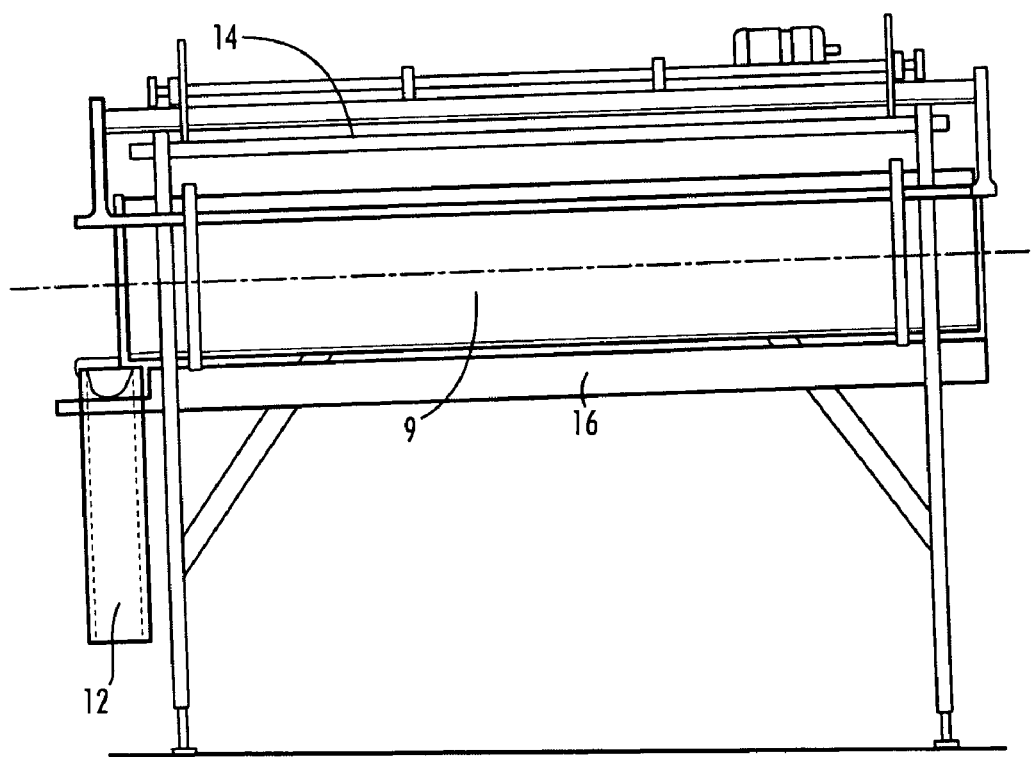
FIG. 3 is a schematic side elevation of the rotating drum according to this invention.
Figure 4A:
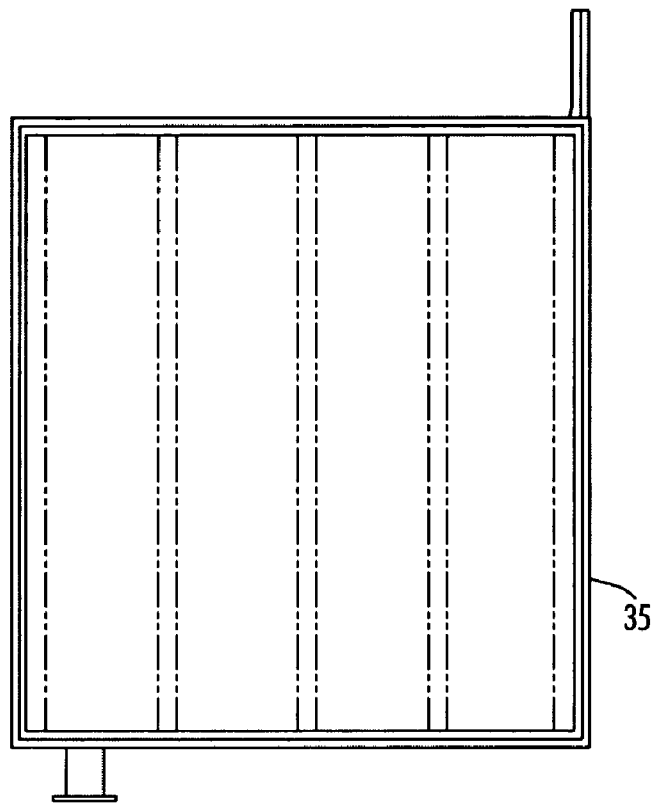
FIG. 4A is a plan view of the heated water recycle tank according to this invention.
Figure 4B:
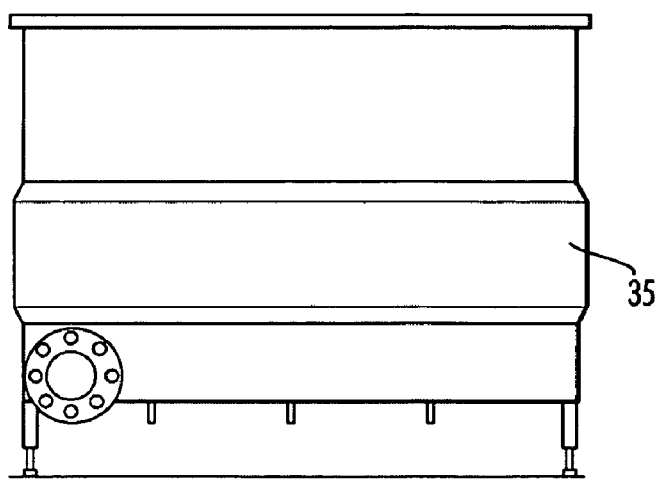
FIG. 4B is a side elevation of the heated water recycle tank according to this invention.
Figure 5A:
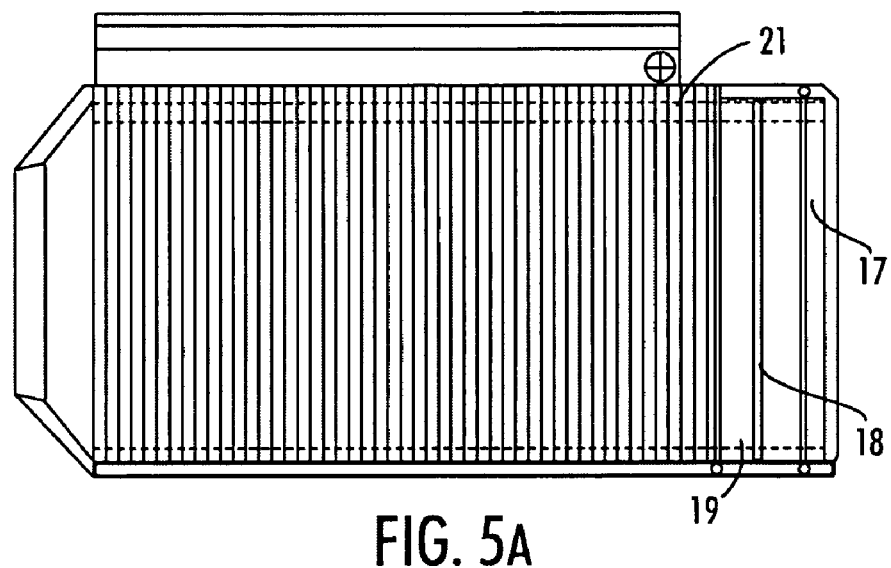
FIG. 5A is a schematic plan view of the first separation tank and horizontal sluice tank.
Figure 5B:
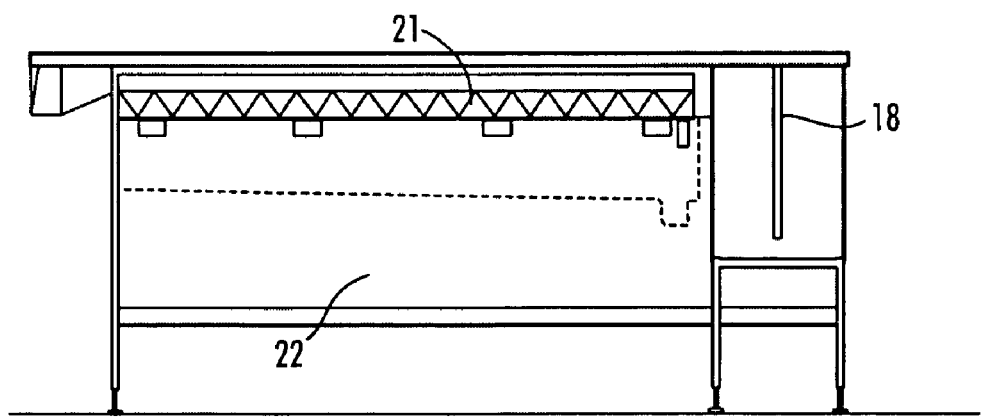
FIG. 5B is a side elevation of the first separation tank and horizontal sluice tank.
Figure 6A:
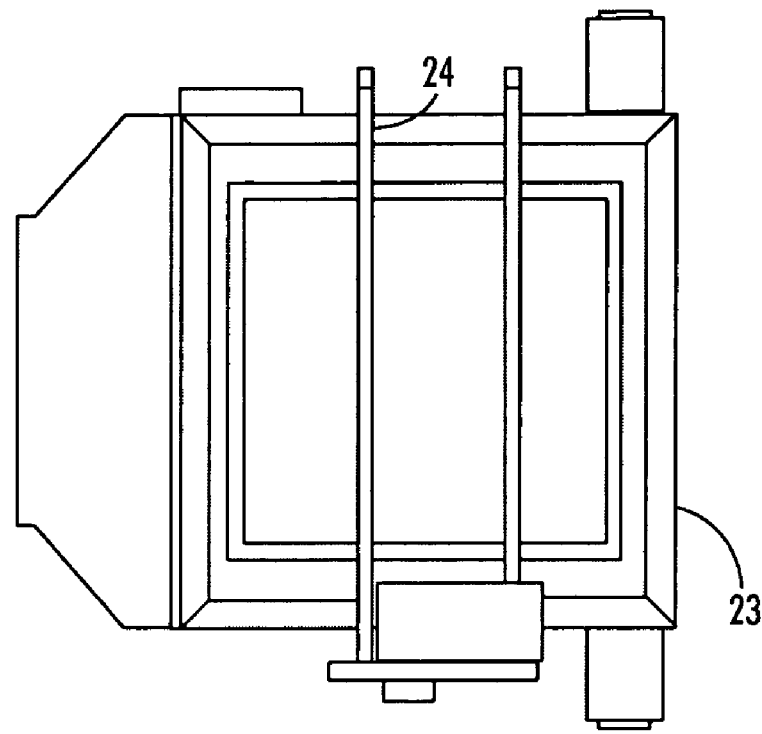
FIG. 6A is a schematic plan view of the second separation tank and the reciprocating pan.
Figure 6B:
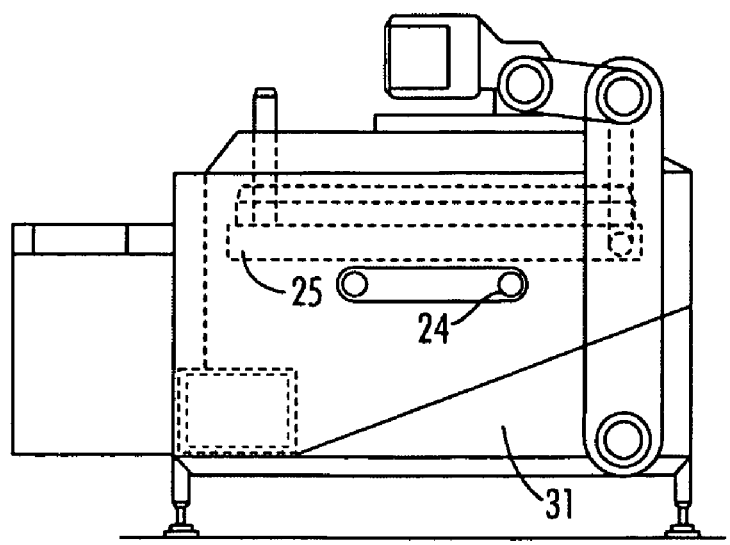
FIG. 6B is a schematic side elevation plan view of the second separation tank and the reciprocating pan.
Figure 7A:
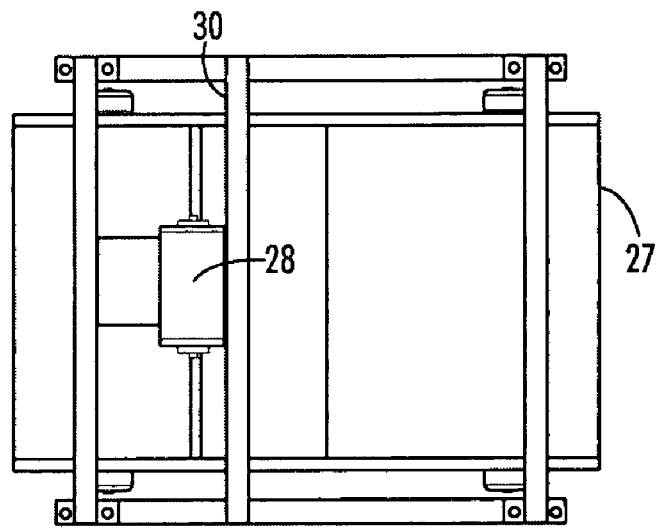
FIG. 7A is a schematic plan view of the vibrating de-watering screen, poultry catch pan, and water catch basin.
Figure 7B:
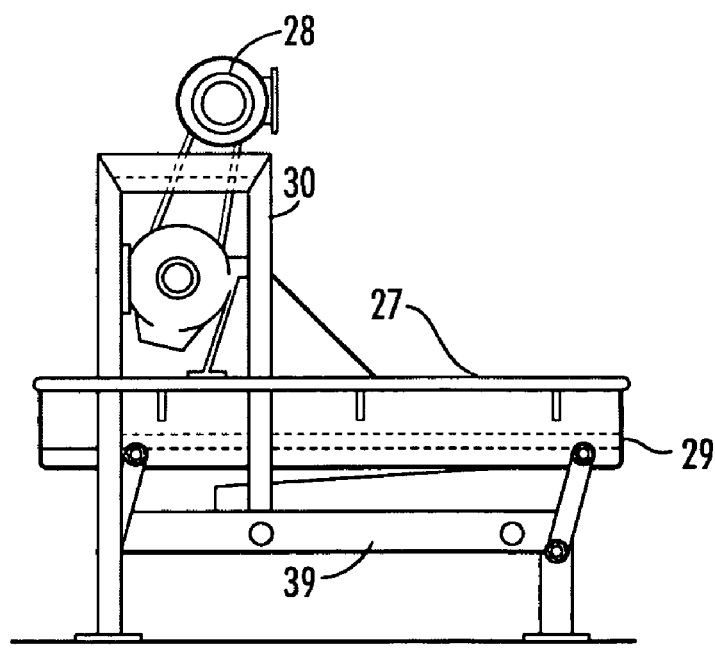
FIG. 7B is a schematic side elevation view of the vibrating de-watering screen, poultry catch pan, and water catch basin.

Inside the rotating drum 9 are a plurality of water spray nozzles 13 (FIG. 2 and FIG. 3) connected to a central high pressure distribution pipe 14 located in the upper area of the inside of the rotating drum 9. Nozzle 13 and distribution pipe 14 receive heated water from a main holding tank 35 that provides water heated to at least 170° F. (76.5° C.). Jets 13 dispense heated water onto the fractured poultry pieces within the rotating drum 9. Jets 13 separate the bones from the poultry pieces by pressure washing the poultry meat from the bone. The washed bones move down the inclined rotating drum 9 while poultry pieces and water pass through perforations of about 0.25 inches in the rotating drum 9 (FIG. 3). The bones without the poultry pieces are rotated down the inclined drum 9 for delivery into a waste container.

The poultry meat, heated water and small fragments of bone are pushed through inclined drum 9 into jacket 16 and flowed out into tank 17. Bones and other debris are rotated to the end of drum 9 and pass by gravity into container 12. Meat settles, with small bone fragments, to the bottom of tank 17 where the pieces are pushed under separator 18 into tank 19, where turbulent water lifts the pieces onto rippled sluice 21 over collecting tank 22. Bone fragments are deposited at the bottom of the ripples while less dense poultry meat passes down the sluice.

The separated poultry and heated water mixture is directed to a second separation tank 23 which has a vibrating perforated pan 25 that is reciprocated up and down by conventional mechanical activators 24. The separated poultry is forced through the perforations in the perforated pan 25 by the up and down reciprocating motions of the pan 25. Any very light weight bone or filament pieces fail to pass through the perforations and remain in the perforated pan 25. The water passes through into a deep catch basin 31.

Meat pieces that pass through the reciprocating pan are directed by water flow onto a vibrated dewatering screen. Water passing through the screen is returned to heater tank 35. The water collected in collection pan 31 is pumped to a main holding tank 35.

The solid poultry meat vibrates off of the dewatering screen and is caught in a perforated tray. The trays of meat are sent on for further processing or packaging.

The water in holding tank 35 is maintained at approximately 170° F. by steam heating or other appropriate methods for heating water. The holding tank 35, poultry flavor extract is mixed with the heated water to provide a constant supply of re-circulating water that contains a natural poultry extract flavor. An anti-foaming agent should be added intermittently to the heated water to reduce the foam produced during pumping and circulation.

A pump provides re-circulation of the heated water poultry extract, and anti-foaming agent, after collection at water collection points along the process. Collection of the water and poultry extract solution allows for constant re-circulation and re-use of the water, minimizing loss of anti-foaming agent and flavor. Any standard plumbing features may be added to the invention. For example, valves could be used to control and balance the flow of water in the system.

The addition of natural flavor extract to the heated water permits the retention of natural poultry flavor in the poultry during extraction of the poultry from bones and during the process of poultry to remove cartilage and other non-poultry components. The heated water with natural poultry extract and anti-foaming agent is re-circulated to the water bath, the rotating drum, water jets, water tank, and to separation water tank, providing a constant flow of heated water and natural poultry extract for extracting and processing the poultry. Temperature in the water is preferably maintained above 160° Fahrenheit to keep dissolved fat in the aqueous phase.

For the apparatus and process of the present invention, the use of heated water 10 of approximately 170° F., preferably, is maintained throughout the process. It also provides for reduction of bacteria in the water. The poultry processed by the present invention provides low plate counts of bacteria when tested by standard industry procedures. The low bacteria plate count of poultry, processed by the current invention, typifies diminished residual bacteria in the poultry, especially for *L. monocytogenes*, a common, dangerous and FDA controlled contaminant in processed meats.

It is thus seen that the invention provides for an apparatus and a process for separation of poultry from bones. The process separates the poultry from the bone, cleans the poultry with heated water having natural poultry extract with minimal loss of poultry flavor, and provides for a recycle of the heated flavored water. Many variations will undoubtedly become apparent to one skilled in the art upon a reading of the above specification with reference to the drawings. As the foregoing description is exemplary in nature, the spirit and scope of the appended claims should not be limited to the description.

What is claimed is:

1. A process for extracting meat from poultry consisting essentially of the steps of:
   providing cooked poultry pieces which include carcass parts having bone material;
   depositing said poultry pieces into a hopper;
   washing said poultry pieces with a water solution;
   separating poultry meat from said bone material by pressure washing said poultry meat from said bone material;
   segregating said separated meat and said solution from said bone material;
   separating said meat from said solution, wherein said meat is bone free;
   collecting said solution; and
   re-circulating said solution from said collecting step to said washing step.

2. A process for extracting meat poultry consisting essentially of the steps of:
   providing a hopper, an inclined rotating drum with a plurality of one fourth inch diameter openings, a plurality of jets within said drum, a conveyor between said hopper and said drum, a source of water solution heated to 76.5° C., a first tank having a separator, a sluice tank with a rippled sluice, a separation tank with a perforated vibrating pan, and a perforated tray,
   providing cooked poultry pieces which include carcass parts having bone and gristle material;
   depositing said cooked poultry pieces in said hopper;
   conveying said poultry pieces to said rotating drum;
   removing meat particles from said poultry pieces by directing said water solution to said pieces in said rotating drum via said nozzle;
   conveying said removed meat particles, water solution and any bone fragments from said rotating drum to said first tank where said meat particles and small bone particles pass under said partition to said sluice tank;
   said rippled sluice conveying said meat particles to said perforated vibrating pan;
   said perforated vibrating pan conveying said meat particles to said perforated tray, wherein said meat particles are free of bone and gristle; and
   said water solution being conveyed from said separation tank to said source of water solution.

3. A process for extracting meat from poultry consisting of the steps of:
   providing cooked poultry pieces which include carcass parts having bone material;
   depositing said poultry pieces into a hopper;
   washing said poultry pieces with a water solution;
   separating poultry meat from said bone material by pressure washing said poultry meat from said bone material;
   segregating said separated meat and said solution from said bone material;
   separating said meat from said solution, wherein said meat is bone free;
   collecting said solution; and
   re-circulating said solution from said collecting step to said washing step.

* * * * *